United States Patent  
Tsukizaki et al.

(10) Patent No.: US 6,856,321 B2
(45) Date of Patent: Feb. 15, 2005

(54) TEXTURE RENDERING METHOD, ENTERTAINMENT APPARATUS AND STORAGE MEDIUM

(75) Inventors: Shinya Tsukizaki, Tokyo (JP); Isamu Terasaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 207 days.

(21) Appl. No.: 10/002,608

(22) Filed: Nov. 15, 2001

(65) Prior Publication Data

US 2002/0060687 A1 May 23, 2002

(30) Foreign Application Priority Data

Nov. 16, 2000 (JP) ........................................ 2000-349707

(51) Int. Cl.$^7$ ................................................. G09G 5/00
(52) U.S. Cl. ........................................................ 345/582
(58) Field of Search ................................. 345/422, 426, 345/552, 582, 589, 601, 602, 617, FOR 122, 211, 212

(56) References Cited

U.S. PATENT DOCUMENTS 5,255,352 A * 10/1993 Falk ............................ 345/582
6,664,962 B1 * 12/2003 Komsthoeft et al. ........ 345/426
6,754,370 B1 * 6/2004 Hall-Holt et al. ........... 382/106

FOREIGN PATENT DOCUMENTS

JP          10-134205         5/1998

OTHER PUBLICATIONS

Hun Yen Kwoon. The Theory of Stencil Shadow Volumes. pp. 1–21 http://www.gamedev.net/reference/articles/article1873.asp.

Taiwanese Office Action Dated Dec. 9, 2003.

Editorial Supervision by Technology Edition CG Standard Textbook Editorial Board, Technology Edition CG Standard Textbook, 5$^{th}$ Printing; Image Information Education Promotion Association, May 24, 1996, pp. 189–192.

* cited by examiner

Primary Examiner—Matthew C. Bella
Assistant Examiner—G. Cunningham
(74) Attorney, Agent, or Firm—Katten Muchin Zavis Rosenman (57) ABSTRACT

In order to form an image by projecting a texture 520 at an arbitrary angle to an arbitrary position on a surface of an object 500 represented as a 3D model, texture data 520 is divided into texture lines 530 having a width of one dot and a length equal to the number of dots on one side of the texture. Then, supposed is a stereoscopic object 540 based on one texture line 530 that the texture line is extended in a light travel direction while possessing color information from an arrangement relationship between the texture line 530, object model 500 and virtual light source in the three dimensional space. The intersecting part 510 between the stereoscopic object 540 and the surface of the object model 500 is defined as a region for rendering the texture line, and thereby a stereoscopic object 540 is rendered onto the defined region.

9 Claims, 10 Drawing Sheets

X IN THE NUMBER

TEXTURE RENDERING METHOD, ENTERTAINMENT APPARATUS AND STORAGE MEDIUM

TECHNICAL FIELD

The present invention relates to computer graphics (CG) and, more particularly, to an art for projecting a texture in real time onto a three-dimensional (3D) model.

BACKGROUND OF THE INVENTION

Due to the recent improvement in hardware performance, the home-use entertainment apparatus has made possible to render real time three-dimensional CG, thus realizing practical three-dimensional CG animations.

In such real-time three-dimensional CG, the shadow volume method is known as an art to render, real time, a shadow of another object onto an arbitrary position in a surface of an object represented as a 3D model.

The shadow volume method determines, concerning the light from a light source, a region undergoing an effect from another object and then represents a shadow by decrease of luminance in that region.

DISCLOSURE OF THE INVENTION

However, the shadow volume method, although suited for representing a shadow onto a region undergoing an effect by another object, is not proper in forming a texture-projected image to this region.

Figure 10A:
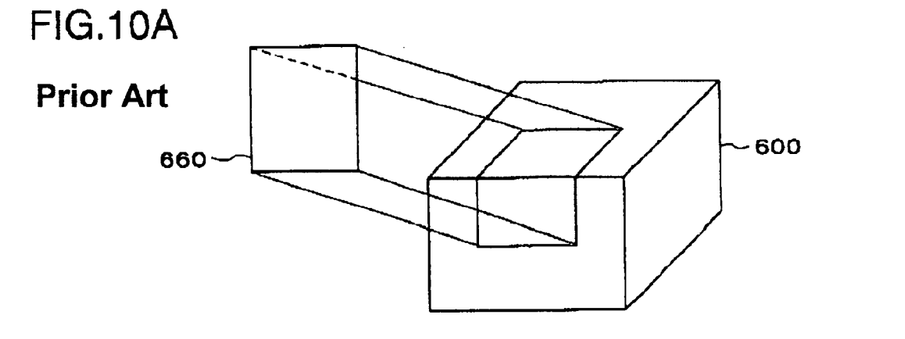
FIGS. 10A to 10C are views for representing an image for forming on an object 600 a shadow of another object 660 by the shadow volume method.
Figure 10B:
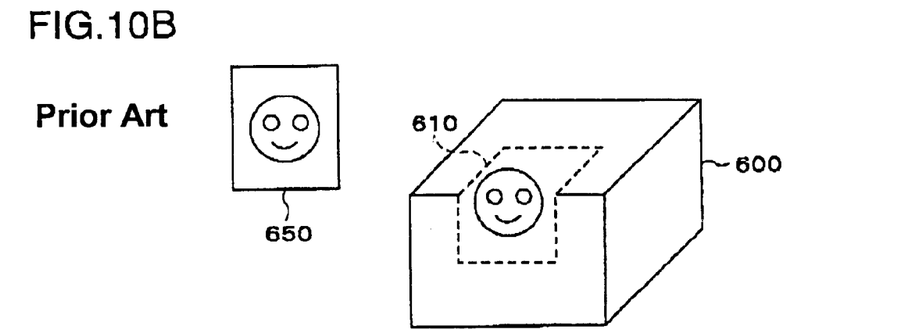
Figure 10C:
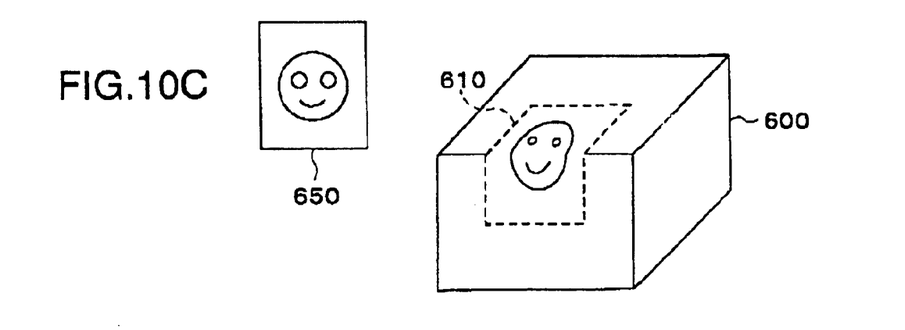

FIG. 10A is a view for representing an image in forming a shadow of another object 660 on an object 600 by the shadow volume method. FIG. 10B is a view for representing an image when the shadow formed by the shadow volume method is used as a rendering region 610 to paste a texture 650 to the rendering region 610 on an object 600. Properly, as shown in FIG. 10C it is desired to represent in a manner deforming along the surface of the three-dimensional object 600. However, the texture 650 is represented as if it were pasted on a flat plane, as shown in FIG. 10B.

The present invention has been made in order to overcome such a problem with representation, and it is an object thereof to provide an art for forming an image by projecting a texture at an arbitrary angle to an arbitrary position on a surface of an object represented as a 3D model.

In order to solve the problem, according to the present invention there is provided the following process in order to render a texture onto a surface of an object represented as a three-dimensional model.

First, texture data is divided into image data (hereinafter, referred to as "texture lines") having a width of one dot and a length equal to the number of dots in one side of the texture. Next, supposed is a stereoscopic object based on one texture line that the texture line is extended in a direction of light travel while possessing color information from an arrangement relationship between a texture line, an object model and a virtual light source in a three-dimensional space, so that an intersecting part between the stereoscopic object and the object model is defined as a region for rendering the texture line to carry out a process to render a stereoscopic object.

BEST MODE FOR CARRYING OUT THE INVENTION

Figure 1:
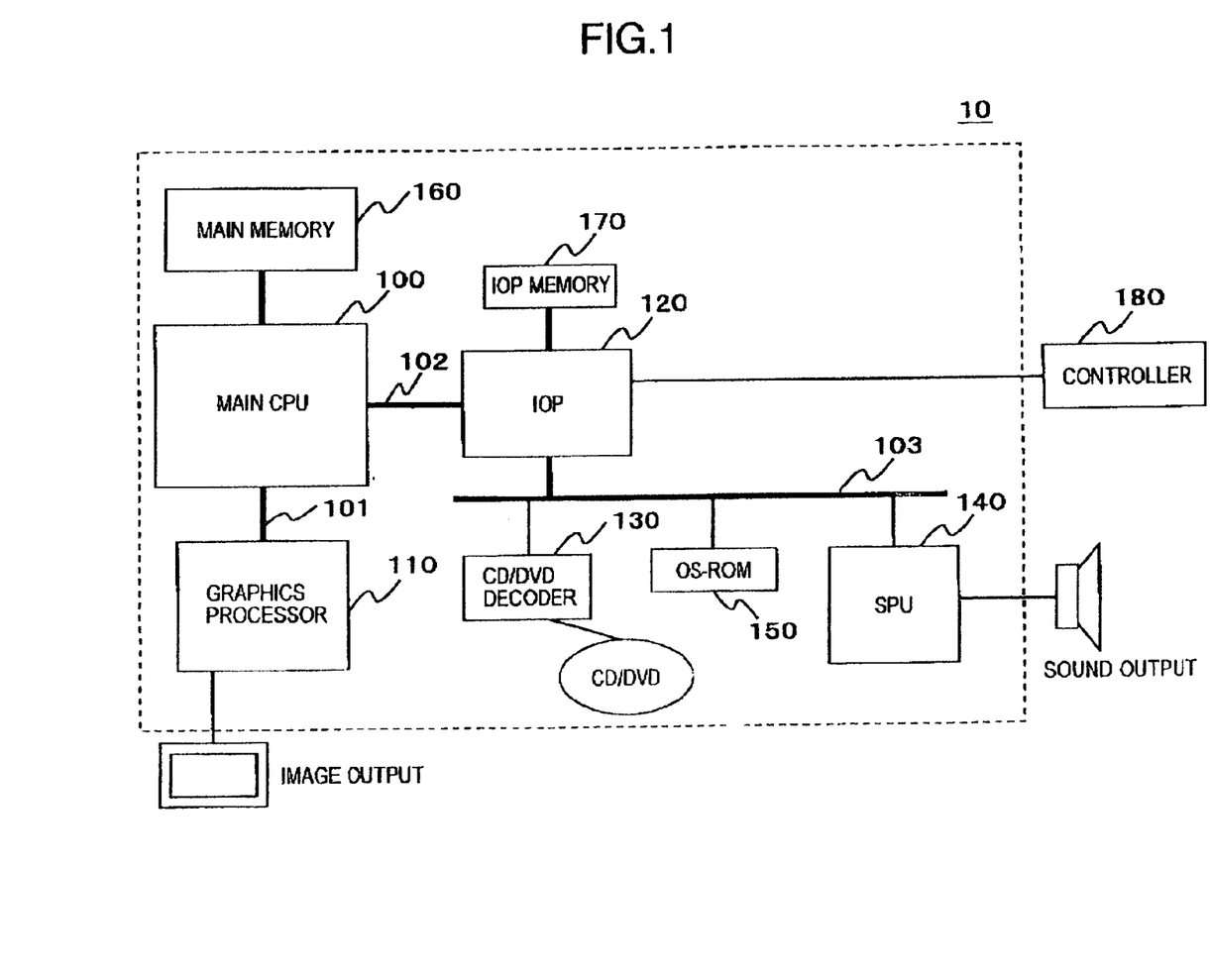
FIG. 1 is a diagram showing one example of a hardware configuration of an entertainment apparatus 10 capable of carrying out the present invention.

An embodiment of the invention will be explained in detail, with reference to the drawings, First, explained is a hardware configuration of an entertainment apparatus 10 on which the invention can be carried out, with reference to FIG. 1. It is, however, noted that the apparatus the invention can be carried out is not limited to the entertainment apparatus 10. The invention can be carried out on an information processing apparatus in various kinds, such as a personal computer, a game apparatus and a graphics-exclusive computer.

In the figure, the entertainment apparatus 10 has a main CPU 100, a graphics processor 110, an I/O processor (IOP) 120, a CD/DVD decoder 130, a sound-reproducing processor (SPU) 140, a sound buffer 141, an OS-ROM 150, a main memory 160 and an IOP memory 170.

The main CPU 100 and the graphics processor 110 are connected together by an exclusive bus 101. Meanwhile, the main CPU 100 and the IOP 120 are connected together by a bus 102. Also, the IOP 120, the CD/DVD decoder 130, the SPU 140 and the OS-ROM 150 are connected to a bus 103.

The main CPU 100 is connected with the main memory 160, and the IOP 120 is connected with an IOP memory 170. Furthermore, the IOP 120 is connected with a controller 180.

The main CPU 100 executes a program stored in the OS-ROM 150 or a program transferred from the CD/DVD-ROM or the like to the main memory 160, thereby carrying out a predetermined process.

The graphics processor 110, although its detailed function will be explained hereinafter, is a rendering processor administering a rendering function of the entertainment apparatus, to carry out a rendering process according to an instruction from the main CPU 100.

The IOP 120 is an input/output sub-processor to control the exchange of data between the main CPU 100 and the peripheral unit, e.g. the CD/DVD reading section 130, the SPU 140 or the like.

The CD/DVD decoder 130 reads data out of a CD-ROM or DVD-ROM loaded on the CD/DVD drive, to transfer the data to a buffer area 161 provided in the main memory 160.

The SPU 140 reproduces the compressed waveform data or the like stored in the sound buffer 141, with a predetermined sampling frequency on the basis of a sound-producing command from the main CPU 100 or the like.

The OS-ROM 150 is a non-volatile memory storing a program and the like to be executed, at a start-up, by the main CPU 100 and IOP 120.

The main memory 160 is a main storage unit of the main CPU 100 and stores the commands the main CPU 100 is to execute, the data the main CPU 100 is to utilize and so on. Meanwhile, the main memory 160 is provided with a buffer area to temporarily store the data read out of the storage medium, such as a CD-ROM, DVD-ROM or the like.

The IOP memory 170 is a main storage unit for the IOP 120 and stores the commands the IOP 120 is to execute and the data, etc. the main CPU 100 is to utilize.

The controller 180 is an interface for accepting an instruction by an operator.

Figure 2:
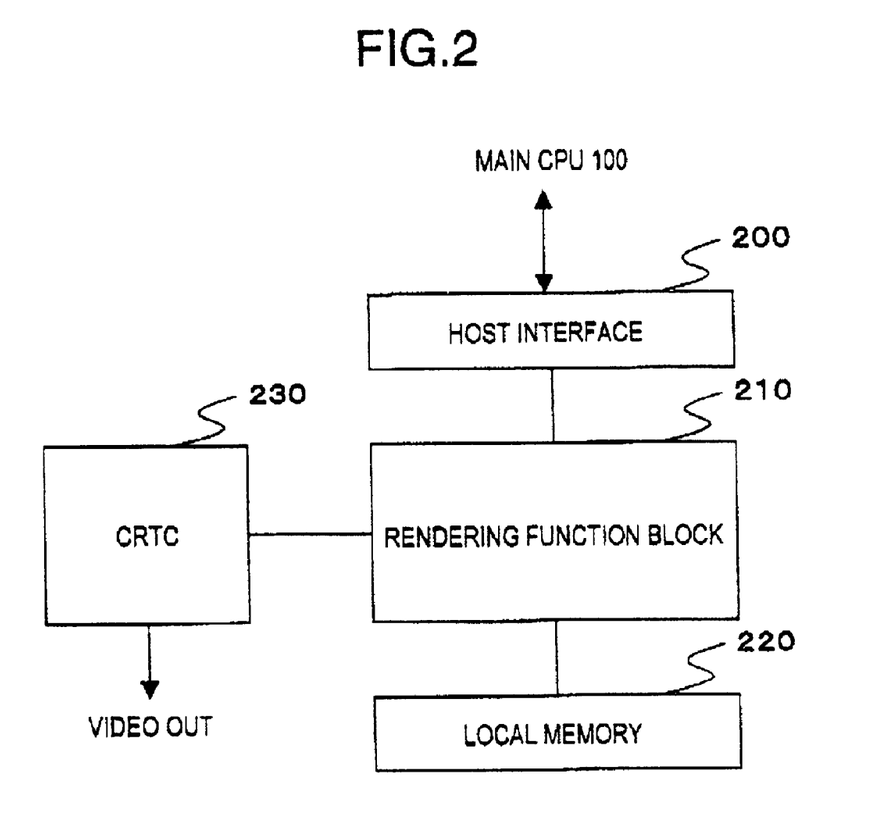
FIG. 2 is a diagram showing an internal configuration of a graphics processor 110.

FIG. 2 is a diagram showing an internal configuration of the graphics processor 110. As shown in the figure, the graphics processor 110 has a host interface section 200, a rendering function block 210, a local memory 220 and a CRTC section 230.

The host interface section 200 is an interface section for exchanging data with the main CPU 100.

The rendering function block 210 is a logic circuit section for carrying out a rendering process on the basis of an instruction from the main CPU 100. The rendering function block 210 has digital differential analyzers (DDAs) and pixel engines respectively 16 in the number, to parallel-process at most 16 pixel data pieces, each having 64 bits (32 bits in color information and 32 bits in Z value). The DDA computes RGB values, Z values, texture values and the like, on the basis of the apex information received from the main CPU 100. On the basis of these values, the pixel engine performs the processes of texture mapping, α blending, shadow volume, etc., thereby preparing the final pixel data.

The local memory 220 stores the pixel data created by the rendering function block 210, the texture data transferred from the main CPU 100 and the like.

The CRTC section 230 outputs, as a video signal, the content in the frame buffer area (see FIG. 3) of the local memory 220, according to a designated output format (NTSC, PAL, VESA format or the like).

Figure 3:
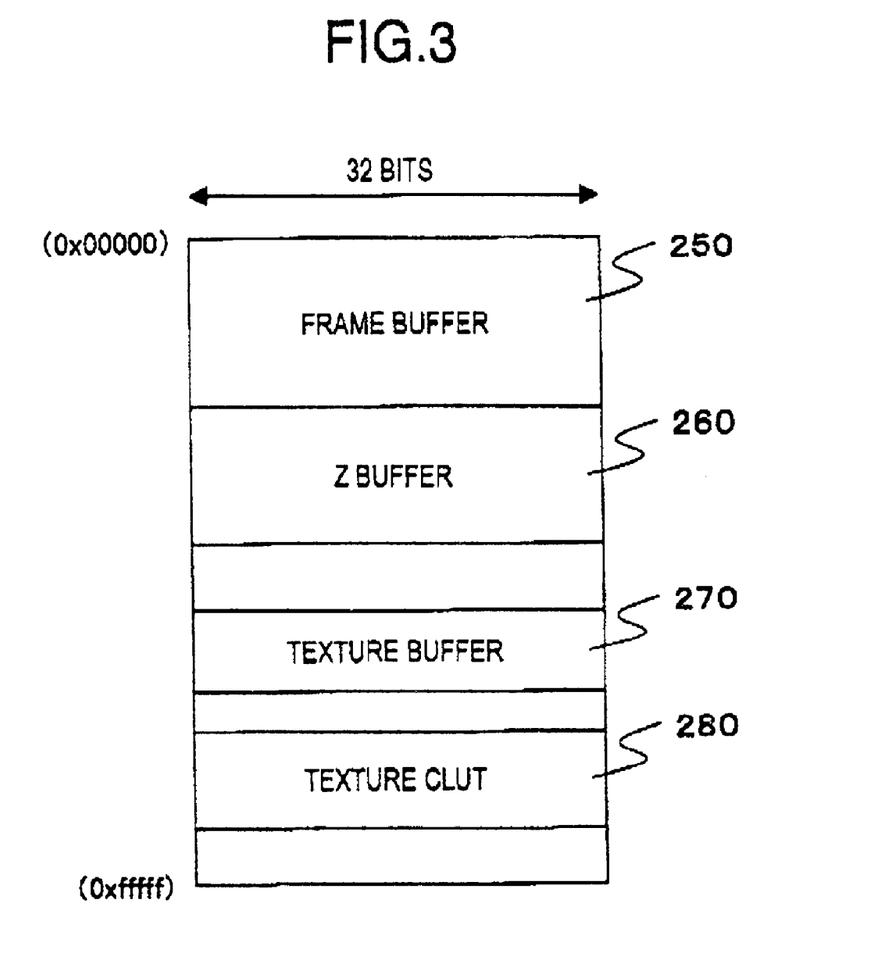
FIG. 3 is a diagram showing a configuration of a local memory 220 of the graphics processor 110.

FIG. 3 is a diagram showing a configuration of the local memory 220. As shown in the figure, the local memory 220 has the frame buffer area 250, a Z buffer area 260, a texture buffer area 270 and a texture CLUT 280.

The frame buffer area 250 and the Z buffer area 270 are the areas for a subject of rendering. The frame buffer area 250 stores the pixels as a result of rendering, while the Z buffer area 270 stores a Z value of the rendering result.

The texture buffer area 270 stores the image data of texture, while the texture CLUT area 280 stores a color look-up table (CLUT) to be used where a texture is represented by an index color.

Note that the areas 250–280 can be arranged on the local memory 220 in an arbitrary order and at arbitrary addresses by setting a proper value to a predetermined control register.

Figure 4:
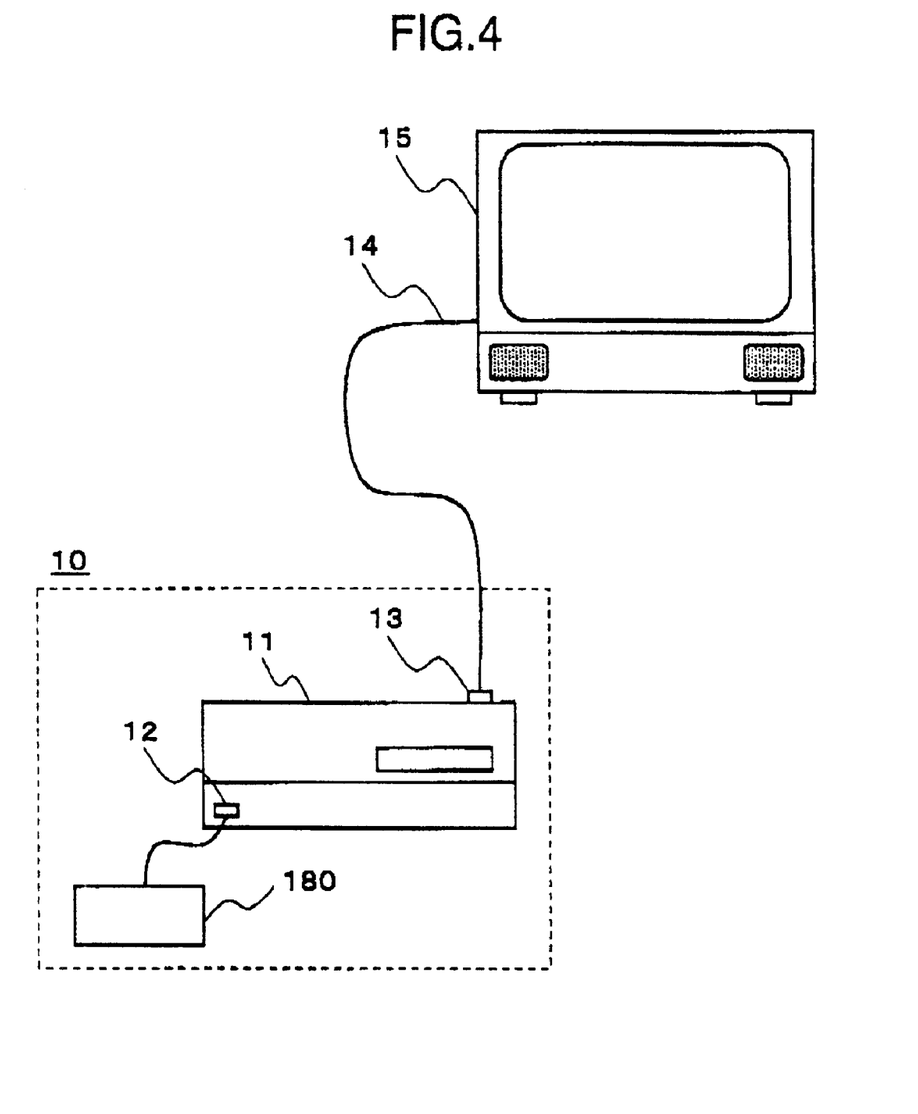
FIG. 4 is a view for explaining a use state of the entertainment apparatus 10.

FIG. 4 is a view for explaining a use state of the entertainment apparatus 10. In the figure, a controller 180 is connected to a connector part 12 of an entertainment apparatus body 11. Also, an image/sound output cable 14 is connected to an image/sound output terminal 13 of the entertainment apparatus body 11. This cable 14 at the other end is connected to an image/sound output unit 15, such as a television receiver unit. An operator of the entertainment apparatus uses the controller 180 to instruct for operation. The entertainment apparatus 10 accepts the instruction from the operator through the controller 180, and outputs the image data and sound data corresponding to the instruction to the image/sound output unit 15. Then, the image/sound output apparatus 15 outputs images and sound.

Next, explanation is made on the 3D model rendering process to be executed by the entertainment apparatus 10 having the above configuration. Application software carries out rendering of an image as required, on the basis of a 3D model stored in a CD/DVD.

First, explained is the rendering function to be utilized for realizing the present rendering method. The present rendering method utilizes a texture mapping function and rendering region creating function to be realized by the graphics processor 110 and main CPU 100.

Note that the texture mapping function can be on/off-controlled by setting a proper value to a predetermined control register.

The texture mapping function refers to a function of image rendering that a texture (image data) stored in the texture buffer area 270 of the local memory 220 is pasted onto a surface of a polygon.

Figure 5:
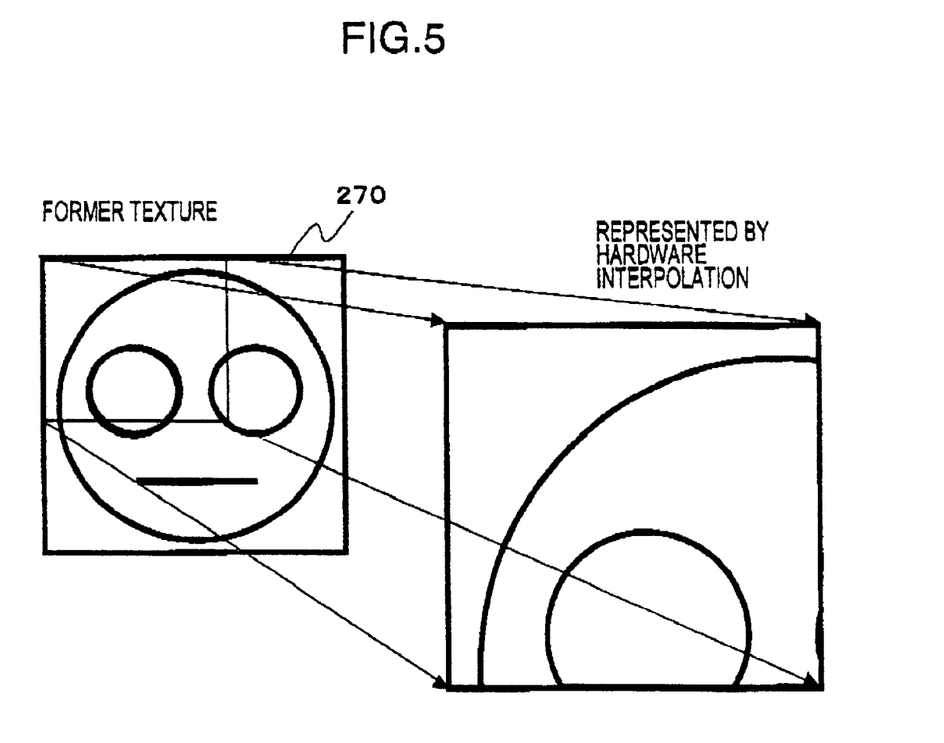
FIG. 5 is a diagram for explaining a mapping function by the graphics processor 110.

FIG. 5 is a view for explaining the texture mapping function by the graphics processor 110. As shown in the figure, if utilizing the texture mapping function, the entire or a part of the texture prepared in the texture buffer area 270 can be properly magnified, reduced, deformed or so to be pasted onto a surface of a polygon. Where instructing the graphics processor 110 to render a textured polygon, the main CPU 100 designates, in addition to the coordinate values of polygon apexes, the texture coordinate values corresponding to the apexes, thus instructing for rendering.

The graphics processor 110, when the texture mapping function is turned on and instructed for polygon rendering, makes reference to the image data placed in the texture buffer area 270 as a texture and carries out texture mapping with proper interpolation, on the basis of a texture coordinate value designated for each polygon apex.

Next, the rendering region creating function is explained. The present embodiment uses, as a rendering region creating method, a technique called a shadow volume method. In the frame buffer of the graphics processor 110, there is a data area capable of designating to allow or prohibit the writing to each pixel in the frame. Herein, this area is referred to as an S buffer, wherein it is assumed that the pixel having an S buffer value of 1 allows writing while the pixel having an S buffer value of 0 prohibits writing.

Figure 6A:
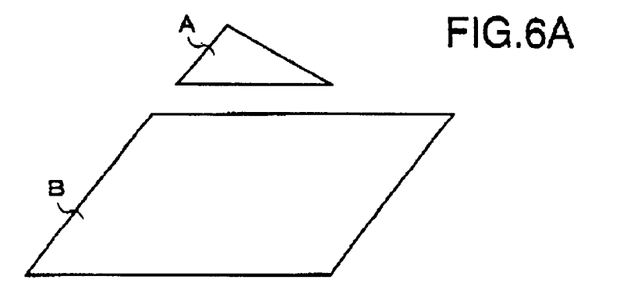
FIGS. 6A to 6D are diagrams for explaining a shadow volume method.
Figures 6B, 6C:
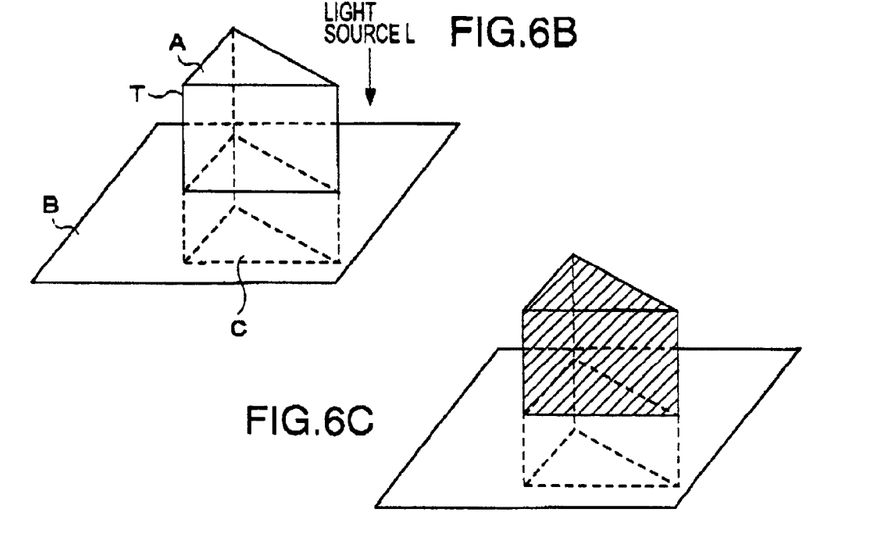
Figure 6D:
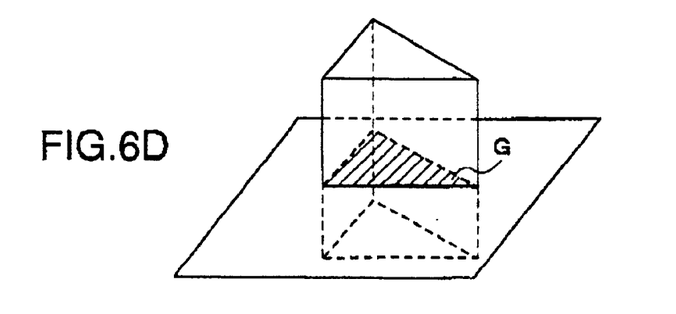

FIG. 6 is a view for explaining the shadow volume method. Herein, explanation is made on an example illustrating that the shadow of an object A shown in FIG. 6A is rendered onto an object B.

At first, an object C is created by moving the object A in a parallel and horizontal way to a direction of a light source L (FIG. 6B). Then, assumed is a triangular prism T defined by the object A and object C. The S buffer corresponding to a front-surface side (on the side seen in the figure) of the triangular prism T is assumably a value of 1. Thereupon, the S buffer corresponding to the region shown by hatching in FIG. 6C is provided a value 1. Next, the S buffer corresponding to a back-surface side of the triangular prism T is assumably a value of 0. Thereupon, only the S buffer corresponding to a part G fallen to a shadow of the object A shown by hatching in FIG. 6D is provided a value of 1. Due to this, the part having the S buffer value of 1 can be given as a rendering region.

Then, if a black semitransparent object, for example, is written to the part having an S buffer value of 1, the shadow of the object A can be rendered onto the object B.

In the present rendering method, these functions are utilized to form an image by projecting a texture to an arbitrary position of an object having an arbitrary shape.

Figure 7A:
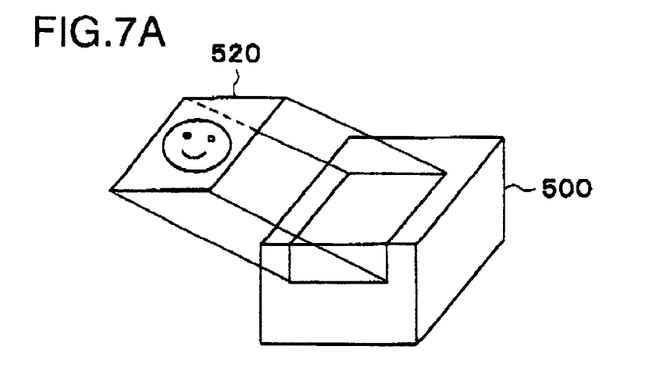
FIGS. 7A to 7E are views for explaining a rendering example in the present embodiment.
Figure 7B:
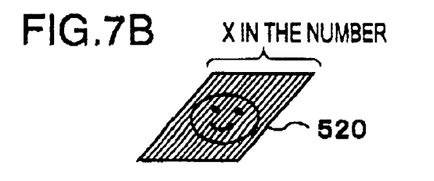
Figure 7C:
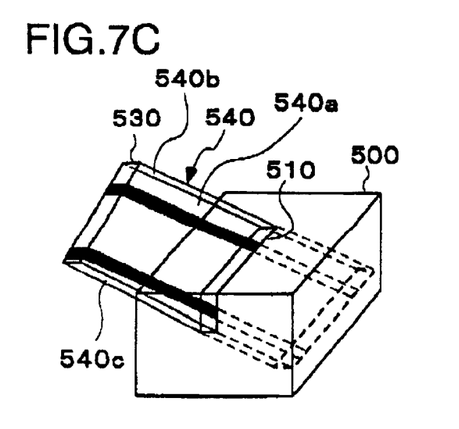
Figure 7D:
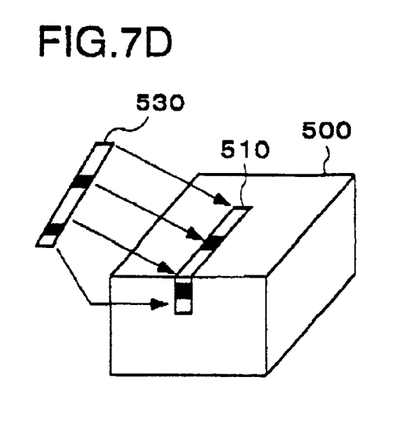

Next, explanation is made on a flow of the present rendering process. FIGS. 7A to 7E are views for explaining an example of rendering in the present embodiment. FIG. 8 is a flowchart for explaining a flow of the present rendering process. Note that this embodiment explains an example illustrating that a texture 520 is projected onto an object 500 as shown in FIG. 7A. FIG. 8 is the flowchart for explaining the process in that case.

The program for realizing the present rendering process is stored, for example, from a CD/DVD-ROM through the CD/DVD decoder 130 to the main memory 160. The main CPU 100 carries out operation according to this program, thereby executing the present rendering process.

The apexes of the object 500 and texture 520 are provided with coordinates on a three-dimensional virtual space and stored in the main memory 160.

Figure 9:
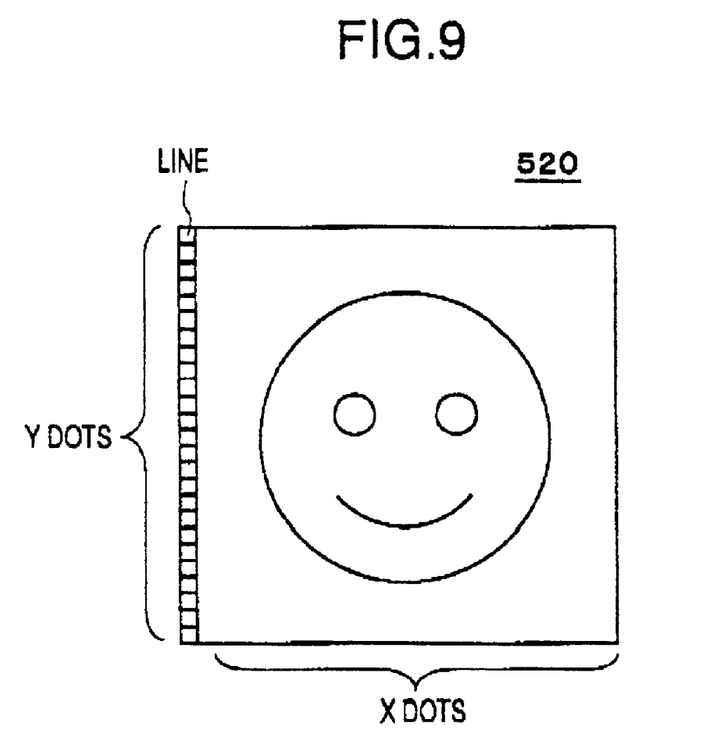
FIG. 9 is a diagram for representing an image of a texture 520.

FIG. 9 is a view for explaining an image of the texture 520. In this example, the texture 520 assumably has a size having horizontally X dots and vertically Y dots (X<Y). When the smaller one of the vertical and horizontal dots of the texture 520 (horizontal in this example) is divided on a dot-by-dot basis, a pixel line having a 1-dot width formed along the greater in the number of dots is referred to as a texture line.

First, in a process S100, the texture 520 is divided into texture lines as above (FIG. 7B), This results in formation with texture lines of X in the number. Note that, although this example divided the smaller of the horizontal and vertical number of dots on a dot-by-dot basis, the greater in the number of dots may be divided on a dot-by-dot basis. However, the division of the smaller in the number of dots is preferred because of the reduction in processing amount.

Next, N=1 is given (S101). Then, a shadow volume method is used for a texture line 530 of N-th line, to form a rendering region 510 on an S buffer (S102), to allow writing to a region corresponding to the texture line 530 of the texture 520 on the object 500 (FIG. 7C).

Then, the texture line 530 of N-th line is rendered onto the write-allowed region 510 of the object 500 (S103). The concrete process in this case is performed as in the following. Namely, when using the shadow volume method, to a side surface 540a (on a side of forming by line movement) of a rectangular parallelepiped object 540 formed by horizontal and parallel movement of the texture line 530, pasted is a texture in a manner of directly extending a dot color constituting the texture line 530. Also, to an upper surface 540b and lower surface 540c of the rectangular parallelepiped object 540, a texture is pasted in a manner of directly extending the dot colors respectively at an upper and lower ends of the texture line 530. Only to the write-allowed region 510 as an intersect part between the rectangular parallelepiped object 540 and the surface of the object 500, a rectangular parallelepiped object 540 is rendered thereby rendering a texture line 530 (FIG. 7D). Note that the object to be formed by a texture line 530 is not limited to a rectangular parallelepiped. For example, variation is possible by the kind of a light source.

Next, N=N+1 is given (S104), to examine whether N exceeds X or not, thereby determining whether there exists a texture line of N-th line or not (S105).

Figure 7E:
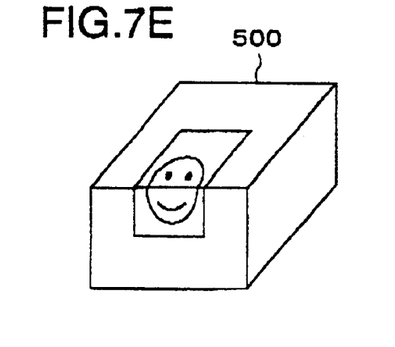
Figure 8:
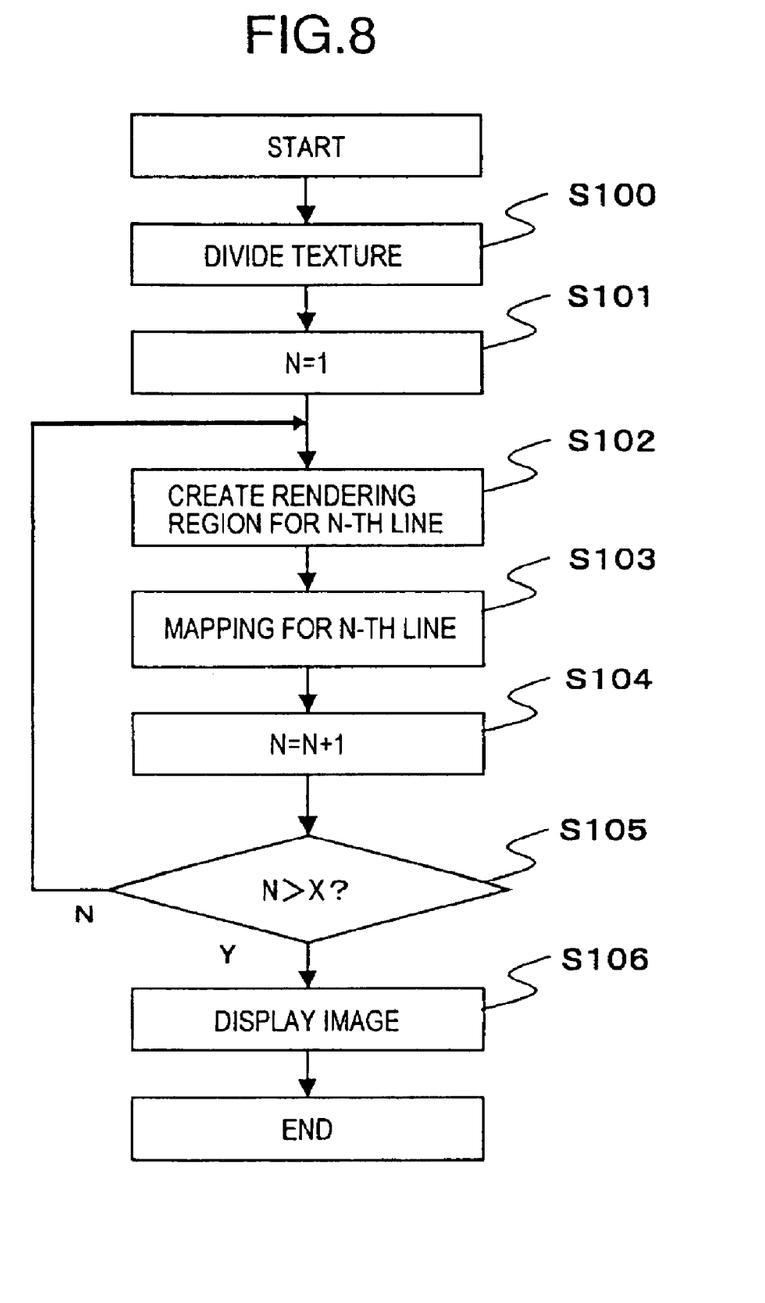
FIG. 8 is a flowchart for explaining a flow of a rendering process in the present embodiment.

In the case that there is no texture line of the N-th line, the rendering process is ended (FIG. 7E). Then, other required processes are made to output an image to the image/sound output unit 15 (S106).

Where there exists a texture line of the N-th line, the process of S102 and the following are repeated.

In this manner, by processing a texture on a 1-dot-line basis, it is possible to carry out mapping in a manner of extending the texture line to the side surface, upper surface and lower surface of the rectangular parallelepiped object 540 without undergoing an effect by the other lines. Consequently, by using this rectangular parallelepiped object 540, it is possible to paste, on real time, a texture to an arbitrary position of an object having an arbitrary three-dimensional shape, along the concave/convex of the object.

By the above process, it is possible to form an image by projecting a texture at an arbitrary angle to an arbitrary position in the surface of a three-dimensional object. Because this process is made for the already-rendered object data, the process time can be shortened, making possible to real-time rendering for three-dimensional CG.

What is claimed is:

1. A method for rendering a texture onto a surface of a first object model represented by a three-dimensional model, comprising:

dividing texture data into a plurality of texture lines each having a width of one dot and a length equal to the number of dots in one side of the texture;

preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and defining an intersecting part between each second object and the surface of the first object model as a region for rendering the associated texture line, thereby rendering the texture data on the surface of the first object model.

2. A method for rendering a texture according to claim 1, wherein said texture lines are parallel to either side having a greater number of dots among a vertical side and a horizontal side of the texture.

3. An entertainment apparatus for carrying out a rendering process, comprising:

means for storing object data represented by a three-dimensional model and texture data to be rendered onto a surface of the object;

means for dividing texture data into a plurality of texture lines each having a width of one dot and a length equal to the number of dots on one side of the texture;

means for preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and means for defining an intersecting part between each second object and the surface of the first object model as a region for rendering the associated texture line, thereby rendering the texture data on the surface of the first object model.

4. An entertainment apparatus according to claim 3, wherein said texture lines are parallel to either side having a greater number of dots among a vertical side and a horizontal side of the texture.

5. A storage medium readable by an information processing apparatus, having recorded therein a program for causing the information processing apparatus to execute a rendering process, said program comprising:

storing object data represented by a three-dimensional model and texture data to be rendered onto a surface of the object;

dividing texture data into a plurality of texture lines each having a width of one dot and a length equal to the number of dots in one side of the texture;

preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and     defining an intersecting part between each second object and the surface of the first object model as a region for rendering the associated texture line, thereby rendering the texture data on the surface of the first object model.

6. A storage medium according to claim 5, readable by an information processing apparatus, having recorder therein a program, wherein     said texture lines are parallel to either side having a greater number of dots among a vertical side and a horizontal side of the texture.

7. A program for causing an information processing apparatus to execute a rendering process, comprising:

storing object data represented by a three-dimensional model and texture data to be rendered onto a surface of the object;

dividing texture data into a plurality of texture lines each having a width of one dot and a length equal to the number of dots in one side of the texture;

preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and     defining an intersecting part between each second object and the surface of the first object model as a region for rendering the associated texture line, thereby rendering the texture data on the surface of the first object model.

8. A method for rendering a texture onto a surface of an object model represented by a three-dimensional model, comprising:

dividing texture data into a plurality of texture lines each having a width of one dot;

preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and     defining an intersecting part between each second object and the surface of the first object model as a region for rendering the associated texture line, thereby rendering the texture data on the surface of the first object model.

9. An entertainment apparatus for carrying out a rendering process, comprising:

means for storing object data represented by a three-dimensional model and texture data to be rendered onto a surface of the object;

means for dividing texture data into a plurality of texture lines each having a width of one dot;

means for preparing a plurality of second three-dimensional object models, each second model based on one of said plurality of texture lines, by projecting said one texture line in a light traveling direction from a virtual light source while possessing color information by means of a shadow volume method, thereby forming a relationship between the texture line, the object model and the virtual light source in a three-dimensional space; and     means for defining an intersecting part between each second object and the surface of the first object model as a region for rendering the associated texture line, thereby rendering the texture data on the surface of the first object model.

\* \* \* \* \*